United States Patent [19]

Adams et al.

[11] 4,316,577
[45] Feb. 23, 1982

[54] ENERGY SAVING THERMOSTAT

[75] Inventors: John T. Adams, Minneapolis; Arlon D. Kompelien, Richfield; Marvin D. Nelson, St. Louis Park; B. Hubert Pinckaers, Edina, all of Minn.

[73] Assignee: Honeywell Inc., Minneapolis, Minn.

[21] Appl. No.: 194,210

[22] Filed: Oct. 6, 1980

[51] Int. Cl.³ .............................................. F23N 5/20
[52] U.S. Cl. .................................. 236/46 R; 165/12; 307/141.4; 236/94
[58] Field of Search ......................... 236/46 R, 47, 94; 165/12, 11; 62/126; 340/309.2; 364/104; 219/506, 492; 307/141.4

[56] References Cited

U.S. PATENT DOCUMENTS

| | | | |
|---|---|---|---|
| 2,558,617 | 6/1951 | Kronmiller | 62/378 X |
| 3,964,677 | 6/1976 | Schalow et al. | 219/492 X |
| 3,979,060 | 9/1976 | Tierce | 236/46 R |
| 4,035,661 | 7/1977 | Carlson | 307/141 |
| 4,079,366 | 3/1978 | Wong | 236/46 R |
| 4,162,610 | 7/1979 | Levine | 368/41 |
| 4,172,555 | 10/1979 | Levine | 236/46 R |
| 4,200,910 | 4/1980 | Hall | 364/145 |
| 4,206,872 | 6/1980 | Levine | 165/12 X |
| 4,248,375 | 2/1981 | Whitney | 236/46 R |

Primary Examiner—William E. Wayner
Attorney, Agent, or Firm—Clyde C. Blinn

[57] ABSTRACT

An energy saving thermostat adapted to be connected to a remote temperature conditioning apparatus for controlling the temperature of air in a space maintains a first temperature during a first time period and a second energy saving temperature during other time periods of the day. The thermostat has a visual indicating means so that when a manually settable switch is pushed, a time interval counter means is energized for indicating and storing a series of pulses each indicative of an hour of setback time into a storage means. The thermostat also has a review button for reviewing the stored time by pulsing the visual indicating means for the number of hours of the time period energy saving temperature.

11 Claims, 14 Drawing Figures

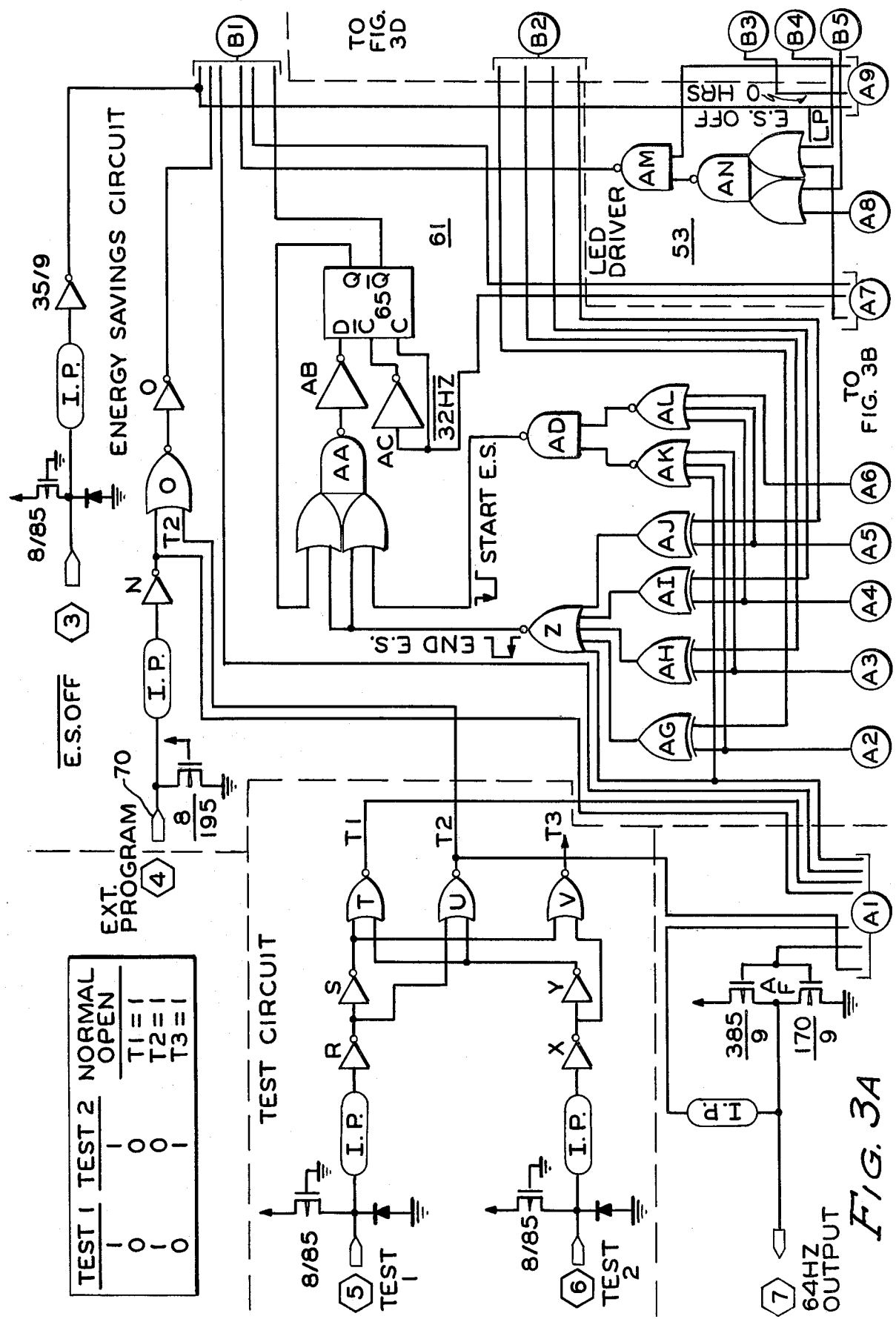

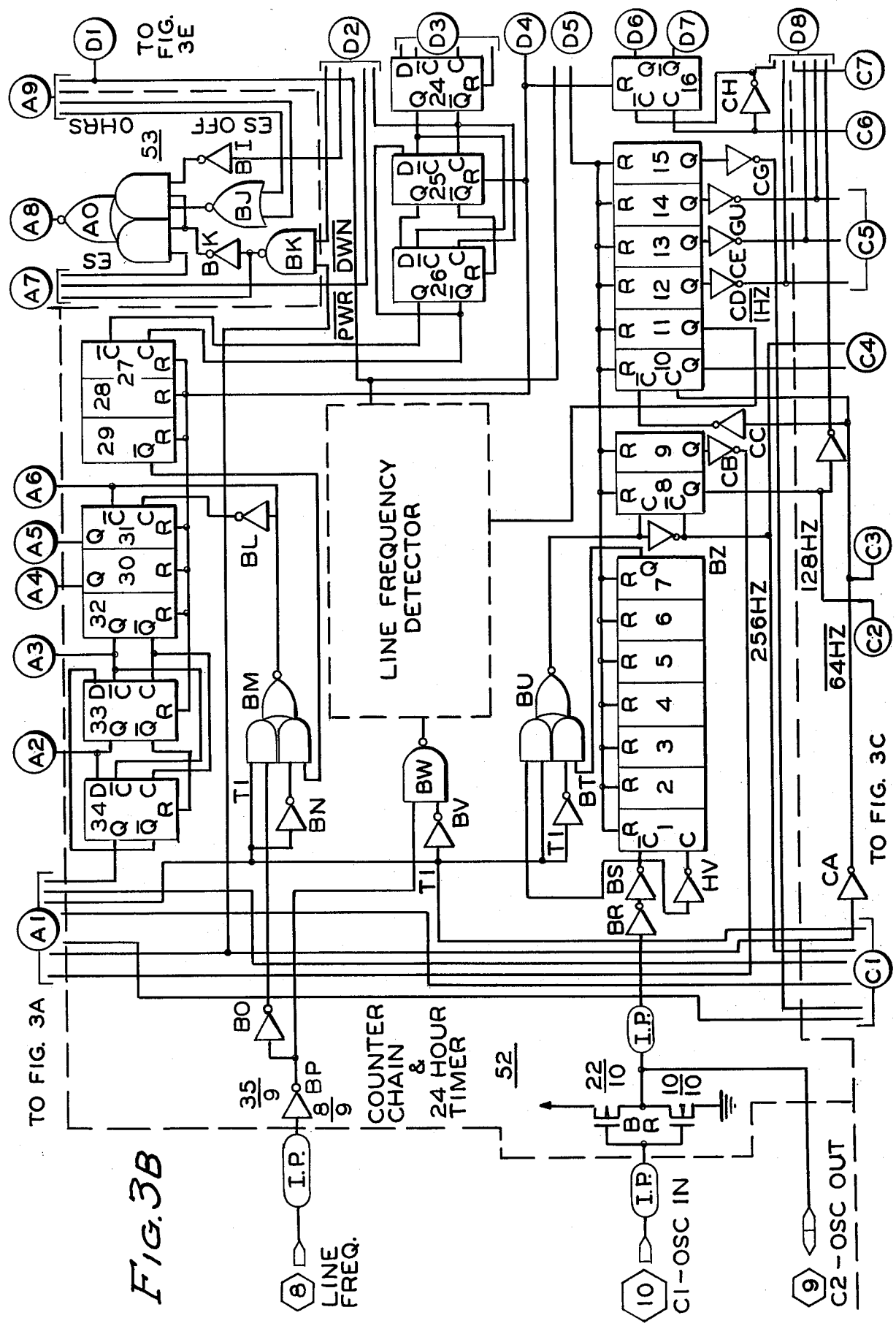

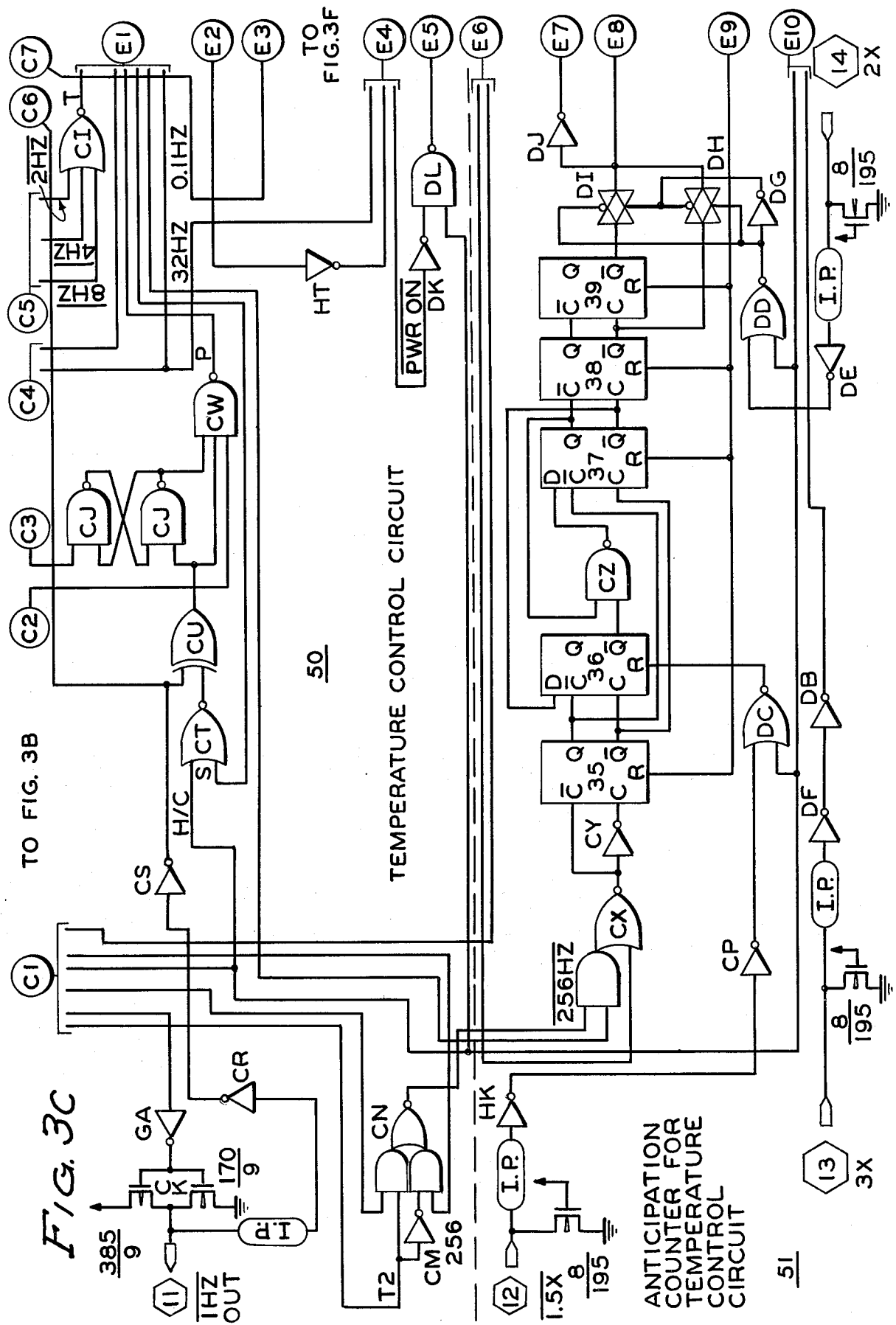

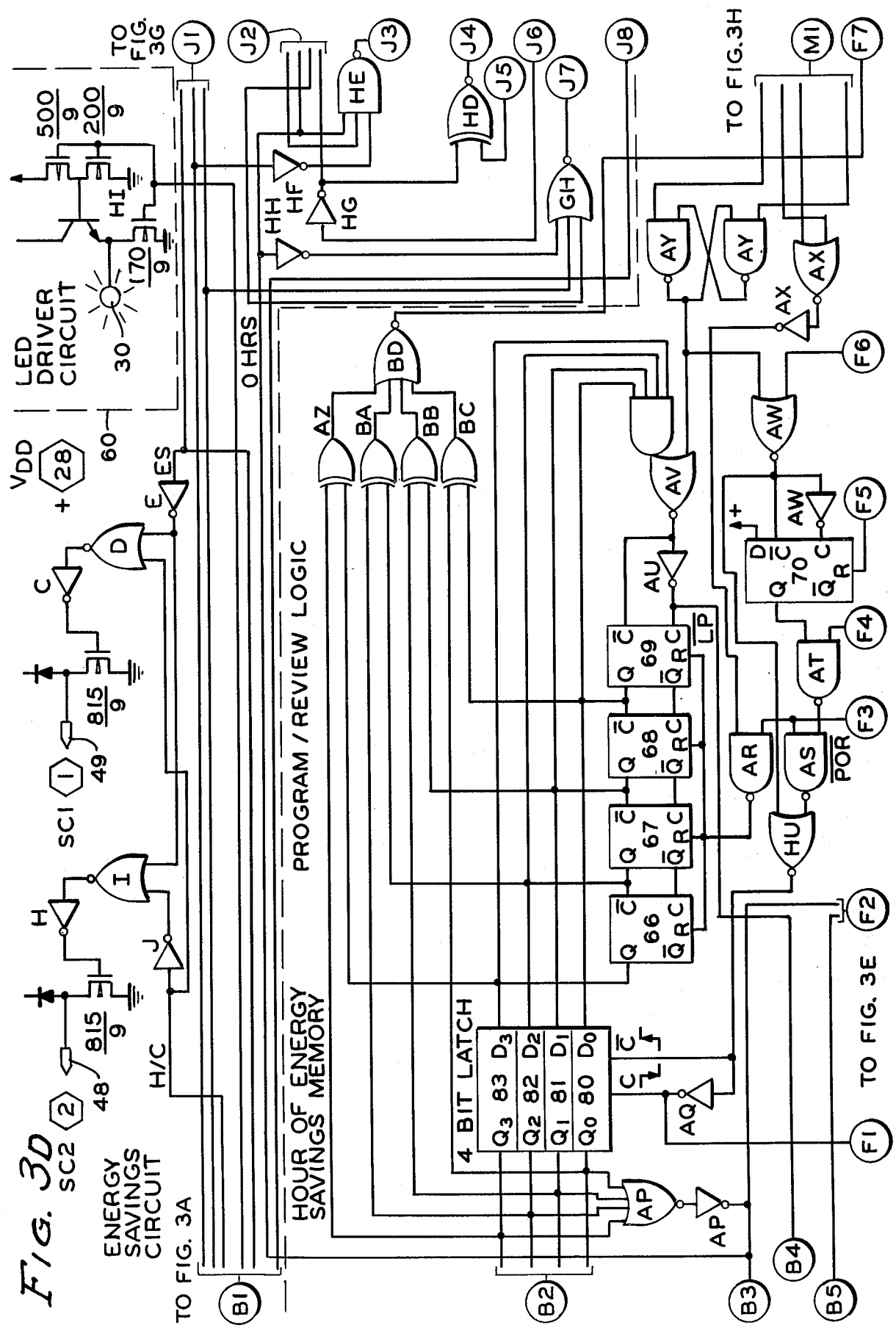

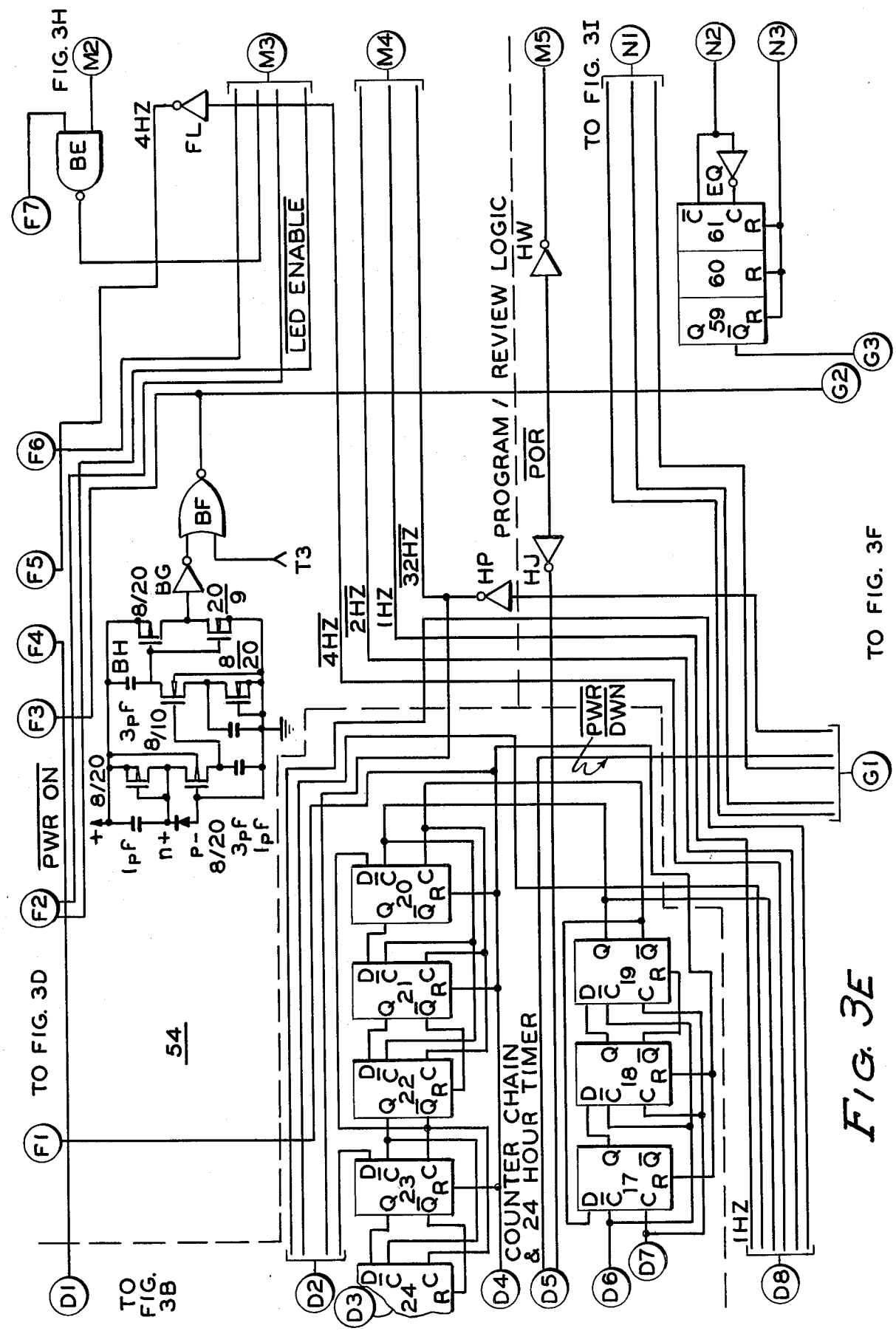

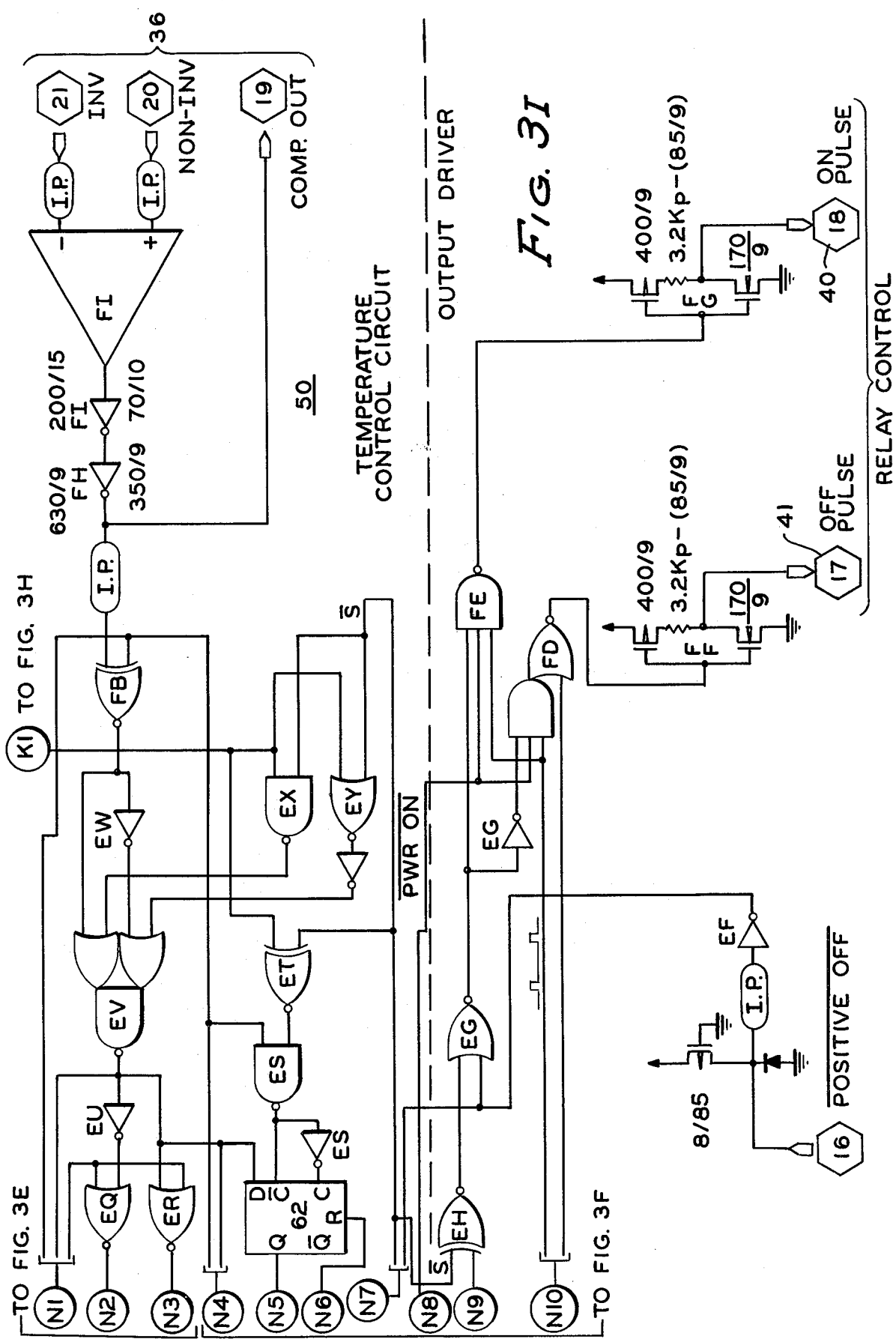

ENERGY SAVING THERMOSTAT

BACKGROUND AND SUMMARY OF THE INVENTION

Clock thermostat apparatus for controlling the temperature in a space at a normal controlled temperature during certain periods of time and reducing the controlled temperature to a lower temperature for heating and a higher temperature for cooling or during other selected periods of time for energy conservation are broadly old. An early thermostat of this type is shown in the Carl G. Kronmiller U.S. Pat. No. 2,558,617 which issued June 26, 1951. Over the years many other clock thermostats have been developed, both mechanical or electrical time mechanism, such as the thermostat disclosed in the Arlon D. Kompelien application, Ser. No. 639,523, filed Dec. 10, 1975, as well as a more complicated electronic thermostat as disclosed in the John M. Whitney U.S. Pat. No. 4,248,375, issued Feb. 3, 1981. Thermostats of this type have been placed on sale by the applicants' assignee in the form of the T8084A Dial Set Chronotherm Thermostat, the T8082A Chronotherm Fuel Saver Thermostat, and the T800A Microelectronic Fuel Saver Thermostat. With the advent of a more concentrated effort for energy saving, the market for a less expensive minimal feature energy saving thermostat has greatly increased.

The present invention is concerned with a minimal feature energy saving thermostat which provides an electronic temperature sensing and control circuit to maintain the temperature during a first period of time with a means to reset the control temperature to an energy saving temperature during a second period of time. The second period of time is manually settable in the thermostat by a time interval counter means which provides electrical pulses to a visual indication device and to a storage means for storing a number of pulses indicative of time intervals as the pulses are visually counted for the energy saving temperature period of time. By means of a review switch, the stored pulses can be reviewed by the visual indication device to determine the energy saving temperature time period.

THE APPLICATION DRAWINGS

FIG. 1 is a schematic representation showing the energy saving thermostat connected to a temperature conditioning apparatus, FIG. 2 is an electrical circuit drawing of the thermostat, FIGS. 3A through 3I are more detailed drawings of each portion of the integrated thermostat circuit shown in FIG. 2, FIG. 4 is a detailed drawing of the integrated circuit regulator shown in FIG. 2, and FIG. 5 is a schematic representation of the electrical pulses which provide for the storing of the time intervals simultaneously with a visual indication of the timer interval counting means.

DESCRIPTION OF THE PREFERRED EMBODIMENT

Figure 1:
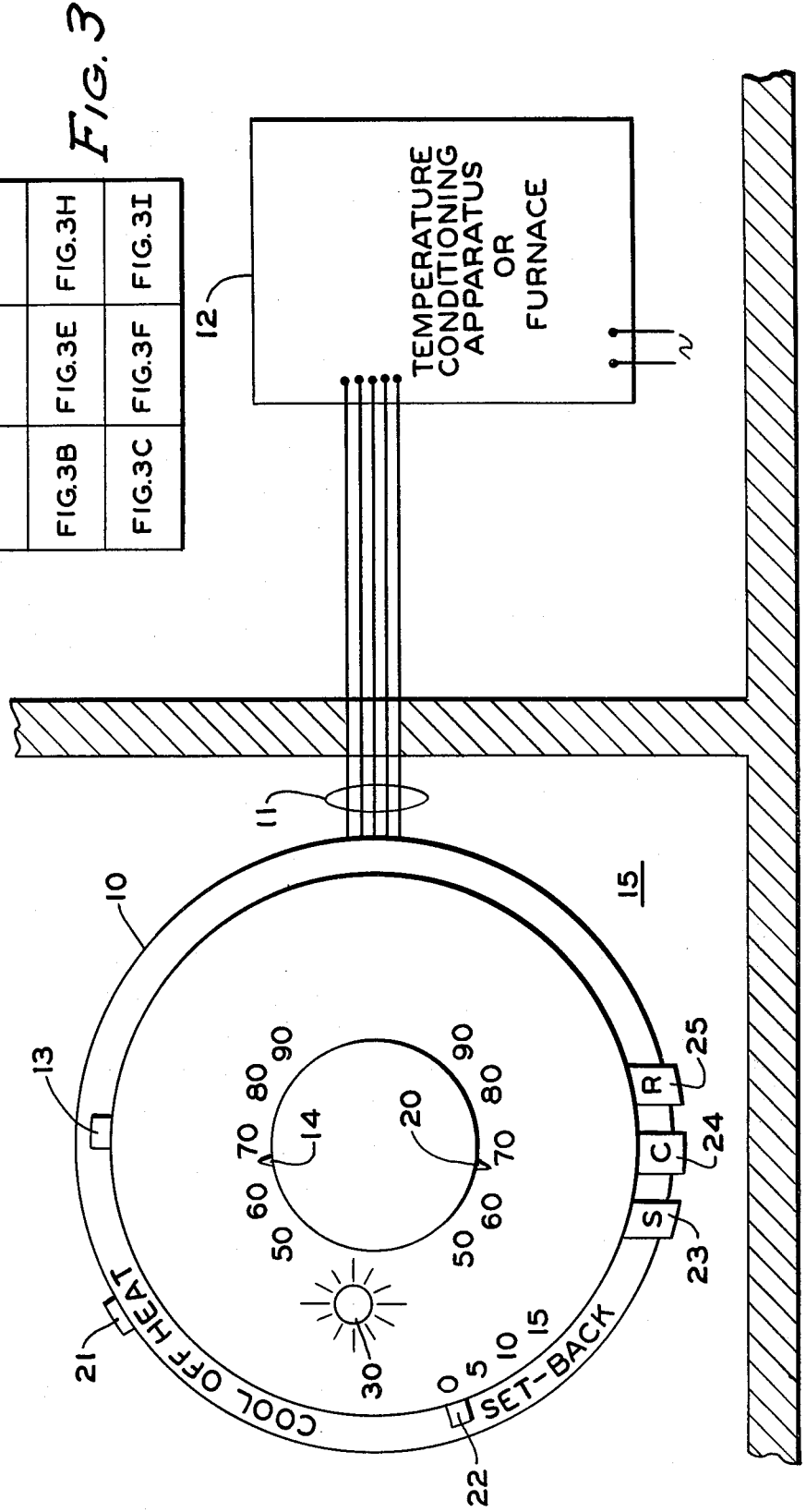

Referring to FIG. 1, the minimal feature energy saving thermostat or temperature control apparatus 10 is shown connected by a five wire cable 11 to a remote temperature conditioning apparatus 12 such as a furnace or a refrigeration heat pump. Thermostat 10 has a temperature control point adjustment member 13 which is moved from left to right to adjust a potentiometer and to position an indicator 14 on a temperature scale to select a desired temperature in the space 15 in which the temperature is being controlled. A second lower scale is for the temperature indication as might be accomplished by a conventional bimetal moving pointer 20. A system switch member 21 is shown for selecting either cooling, off, or heating, depending upon the position of member 21. A temperature setback or deviation from the normal control point is selected by member 22 which is shown at the 0° setback or deviation. Upon moving member 22 to the 15° setback, when thermostat 10 is in a setback temperature operating mode, the temperature would be 15° from the selected temperature previously mentioned in connection with member 13. A more specific explanation of the setback or deviation operation is described in the mentioned John M. Whitney U.S. Patent.

Switch or button 23 is a manually operated set (S) switch which provides the time established for the setback temperature control. Switch or button 24 is to change (C) the operation of the thermostat from the normal temperature to the setback temperature and vice versa. Switch or button 25 is to obtain a review (R) of the setback time. The operation of switches 23, 24 and 25 will be described in more detail later in the specification.

Figure 2:
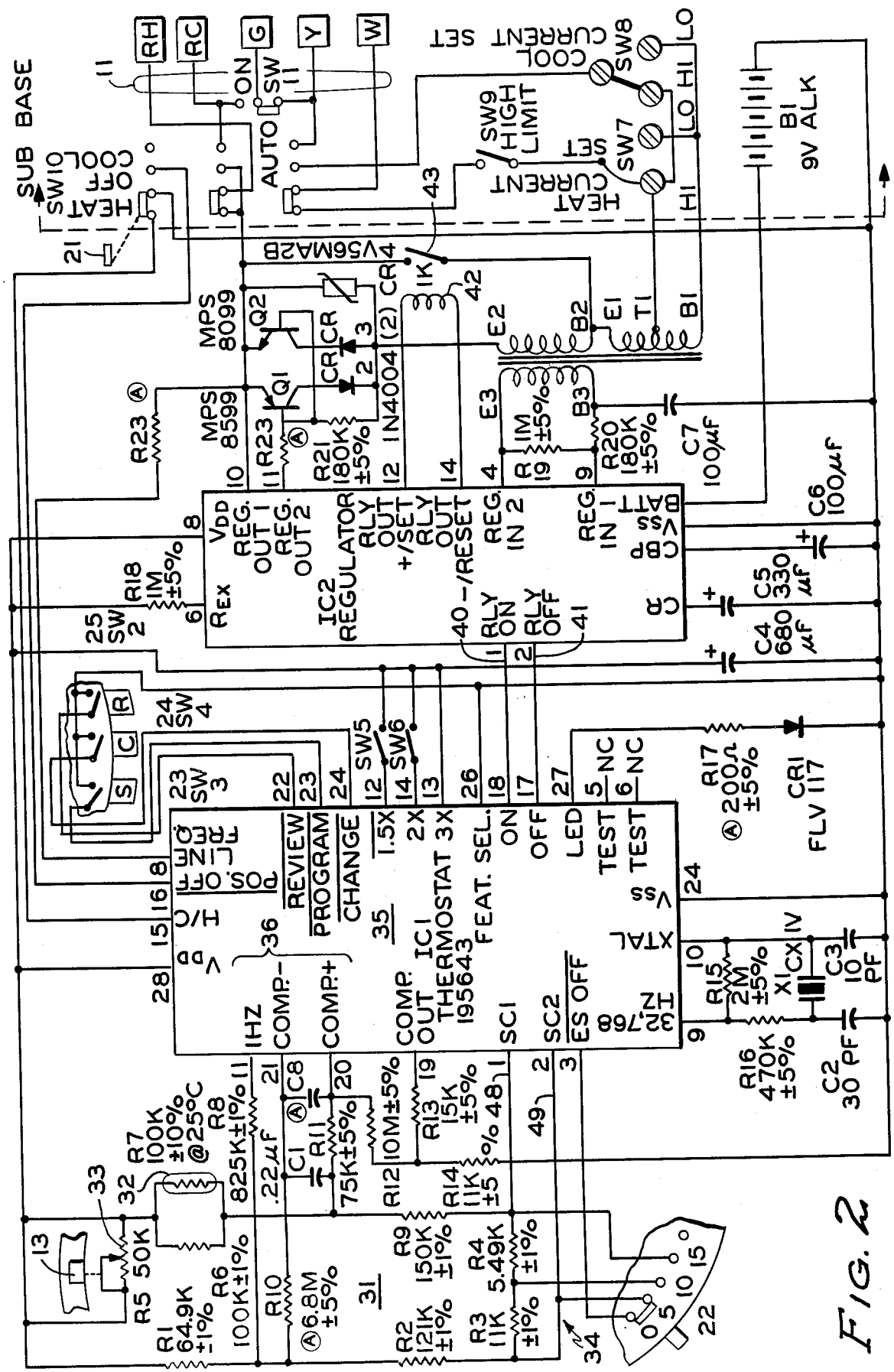

Referring to FIG. 2, a circuit diagram of the thermostat is shown. An electronic bridge circuit 31 contains a space temperature responsive resistance element 32, a temperature control point selection potentiometer 33 which is adjusted by member 13, and a deviation circuit 34 which is adjusted by the position of member 22. The bridge circuit has an output which is fed into the main temperature control integrated circuit 35 which is shown in more detail in FIG. 3. By the adjustment of member 13, potentiometer 33 selects the temperature at which the bridge is balanced and thus the temperature control point of the thermostat. By the adjustment of member 22, various portions of resistances at 34 are included in the bridge circuit to modify the control point to provide for the temperature setback or deviation from the temperature control point selected by member 13 similar to the disclosure of the mentioned John M. Whitney application.

Figure 4:
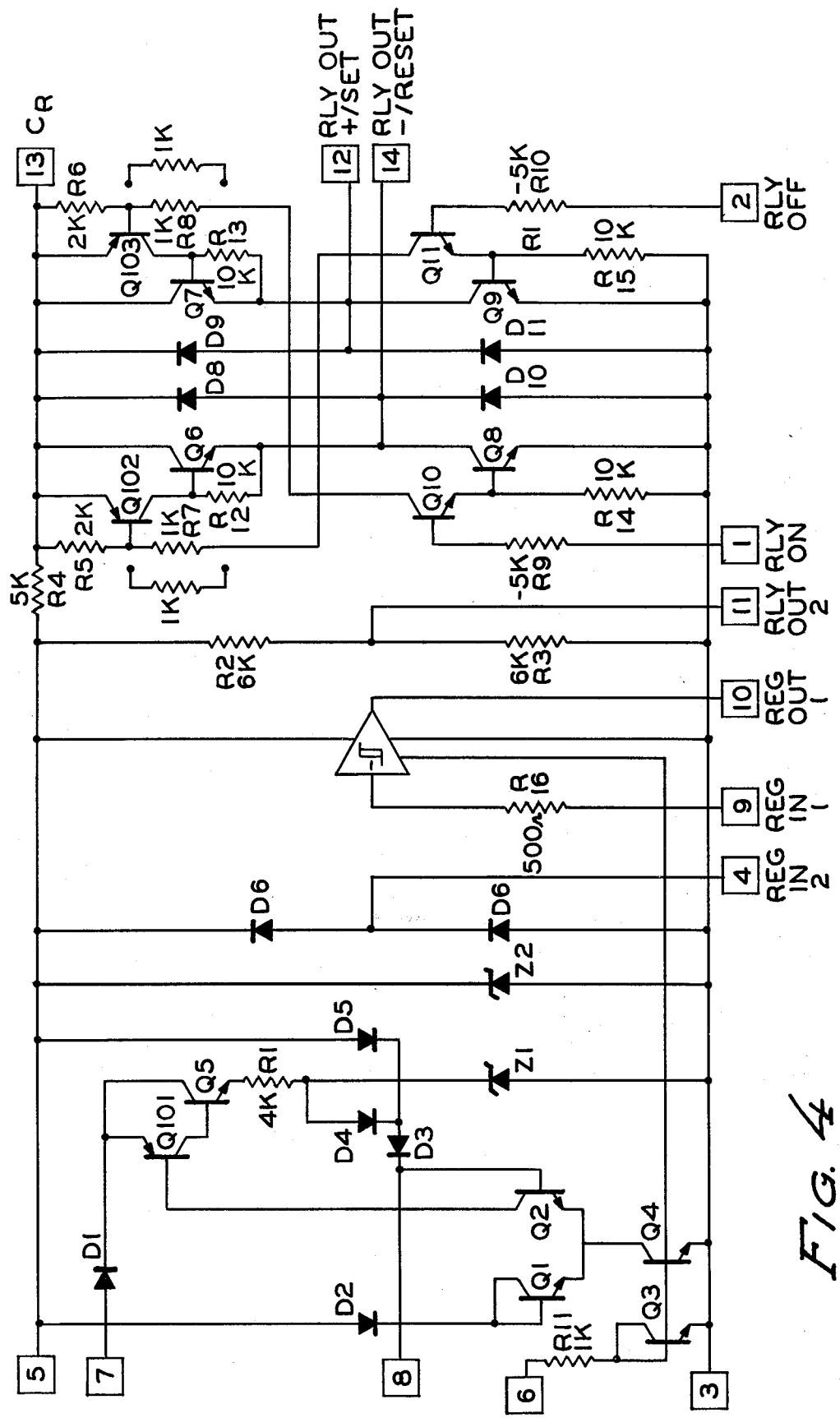

The output at 36 of bridge circuit 31 upon being connected to the integrated thermostat circuit 35 provides for the output at connections 40 and 41 as pulses to control the operation of a relay 42 through the integrated circuit regulator 39 shown in detail in FIG. 4 to either close or open a switch 43. Temperature conditioning apparatus 12 of FIG. 1 connected over wires 11 is controlled in a manner as selected by system switch 21 to provide heating or cooling in space 15. A system fan of apparatus 12 is controlled in a conventional manner by switch 46. A temperature responsive high limit switch 47 is contained in the sub base to be responsive to the temperature in space 15.

Figure 3F:
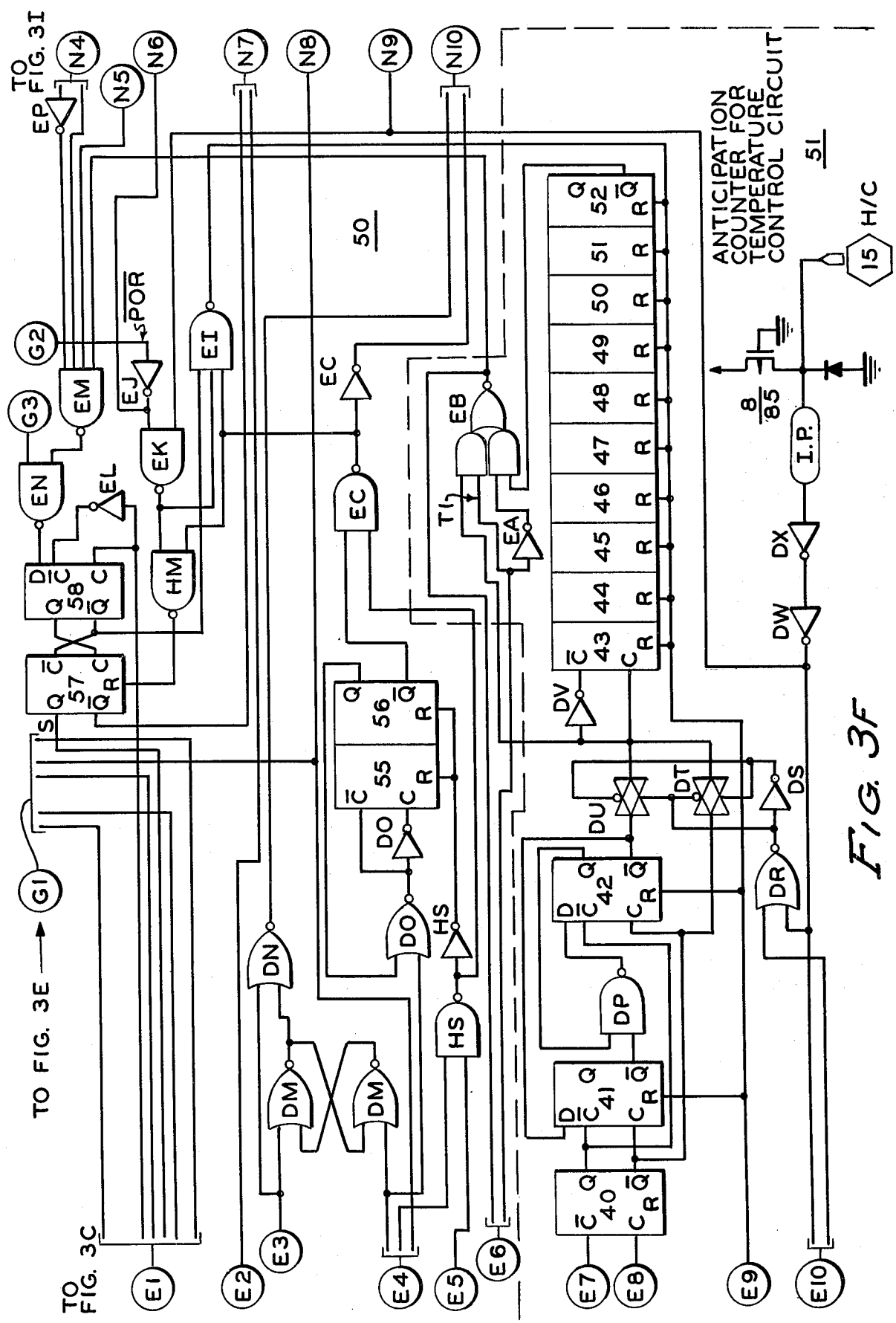
Figure 3G:
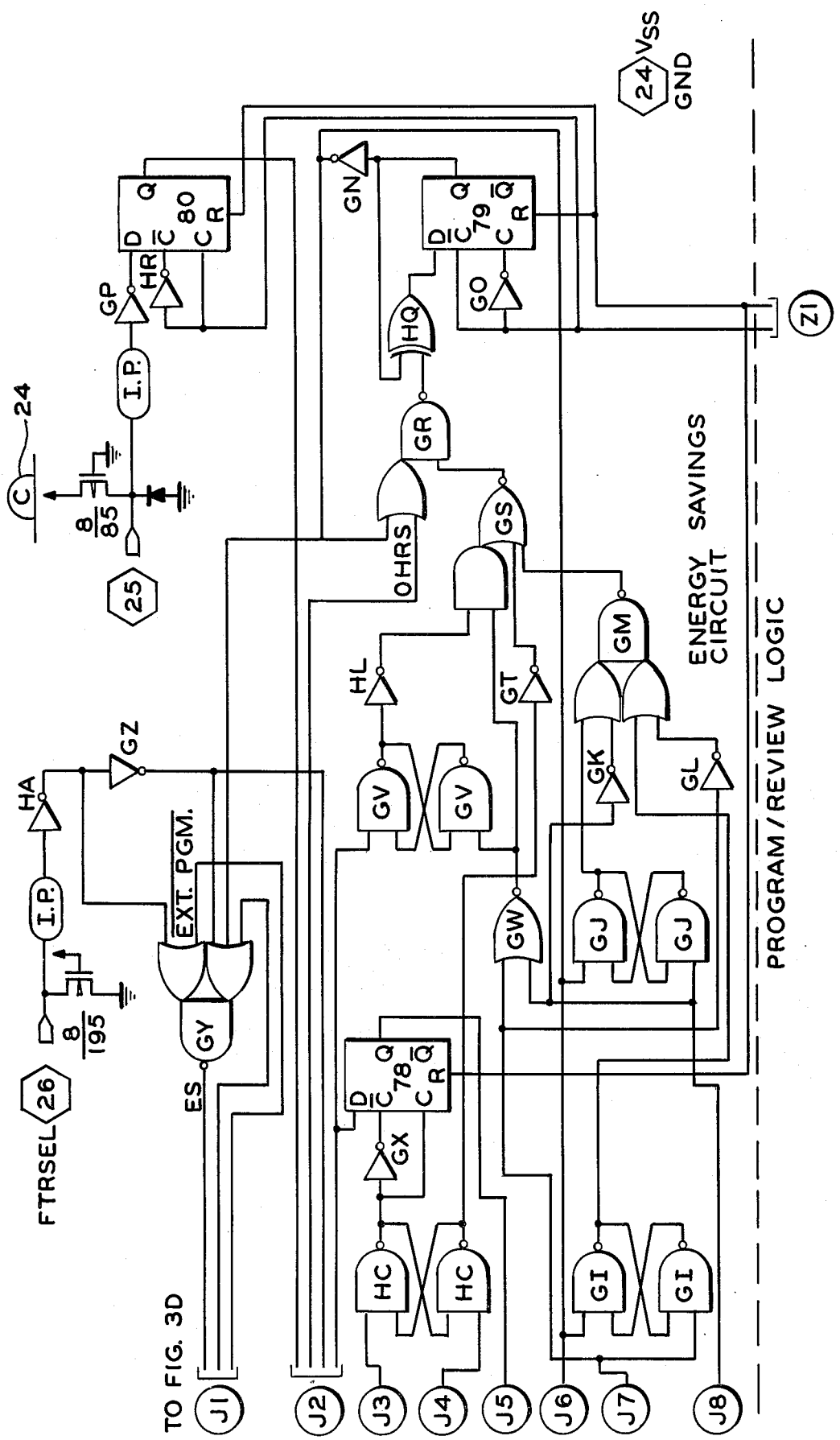
Figure 3H:
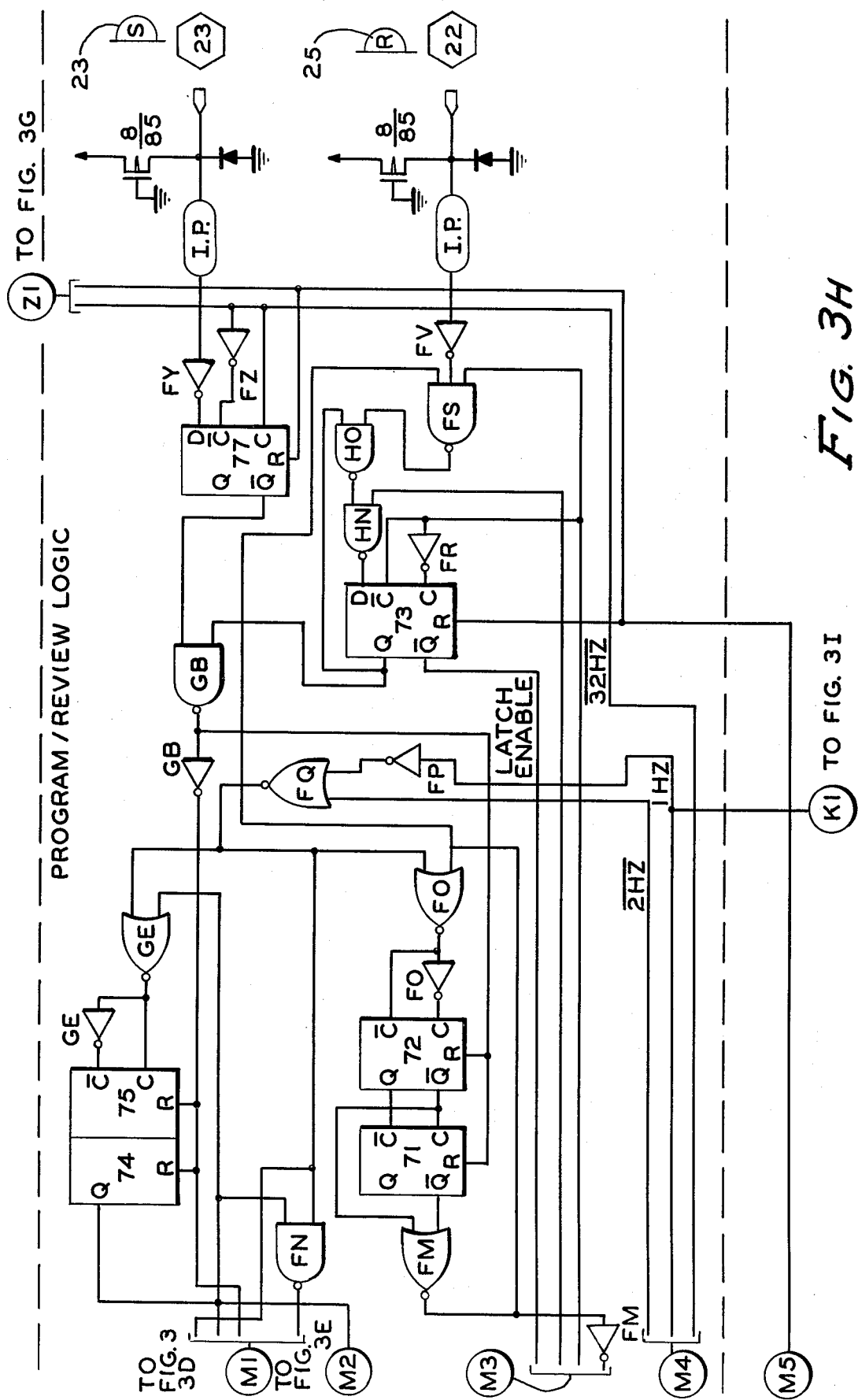

Referring to FIG. 3, thermostat control circuit 35 is shown in more detail. A temperature control circuit or logic 50 (shown in FIGS. 3C, 3B, 3E, 3F, 3H and 3I) contains as a part an anticipation counter circuit or logic 51 (shown in FIGS. 3C, and 3F) for the temperature control circuit 35. Circuit 50 has connected thereto the output 36 (shown in FIG. 3I) of bridge circuit 31 as shown in FIG. 2 to provide the output at terminals 40 and 41 (shown in FIG. 3I) to control relay 42. A counter chain and 24 hour timer circuit 52 provides an output to a LED (light emitting device) or indicating device 30 through driver 53 of FIGS. 3A and 3B and driver circuit 60 of FIG. 3D and to a memory 54 (shown in FIGS. 3D and 3E) to select a second time period during which a signal modifies the control temperature of the temperature control circuit 50 as selected by the setback or deviation selector 22 for a second period of time as would be stored in the memory 54.

Specifically, when the set switch 23 (shown in FIGS. 1, 2 and 3H) is manually pushed by the home owner at some particular time such as 10:00 o'clock in the evening, a number of hours or increments of time for a second period of time is stored in the memory 54. In more detail, upon closing switch 23, counter chain and 24 hour timer 52 produces an electrical pulse of a three second duration as shown graphically in FIG. 5. The pulse set memory circuit 54 energizes the LED driver 53 to produce an output to the LED output driver circuit 60 to energize the indication means or LED 30 on the thermostat to provide an indication that subsequent light pulses should be counted. A subsequent pulse chain is then provided, one pulse for each hour of setback as shown in FIG. 5. These pulses energize the LED and are stored in the program memory circuit 54 to store a predetermined number of hours for the second setback temperature time period in the memory.

Thereafter, upon 24 hour timer 52 going through a 24 hour operation, the output of the 24 hour timer is compared with memory 54 through the energy saving logic circuit 61 (shown in FIG. 3A). At the time the setback period is set, a signal is fed to the temperature control circuit 50 through one of the output terminals to modify bridge circuit 31 at circuit 34 (in FIG. 2) for a lower temperature control level depending on the position of the setback member 22. Output circuit 48 is for heating and output circuit 49 is for cooling.

At any time, upon a closing of the manual review switch 25 (R) of FIGS. 1, 2 and 3G, memory 54 will be interrogated to provide an output through LED driver 53 and circuit 60 at the visual indication means 30 of the stored time previously set in the memory. The closing of switch 25 causes the program review logic of the memory circuit 54 to pulse the LED output driver circuit 60 once for each hour similar to the graphical showing in FIG. 5. By counting the number of visual pulses, the number of hours of delay that is stored in the memory is indicated.

A change switch 24 (C), shown in FIGS. 1, 2 and 3G, of the energy saving circuit 61 shown in FIG. 3A provides for a change in the operation of the temperature control circuit from one control mode to the other. Thus, if the control circuit is in the energy saving mode and the home owner wishes to return to the normal temperature selected by lever 13, upon operation of the change button or switch 24, the normal temperature is maintained until the next setback time period.

OPERATION OF THE PREFERRED EMBODIMENT

With the minimal feature energy saving thermostat, the home owner can select a normal temperature control by the position of lever 13 as shown in FIG. 1. Temperature control circuit 50 by the operation of the relay 42, controls the temperature conditioning apparatus to maintain that temperature in space 15. Such a control is accomplished for either heating or cooling, depending upon the position of system switch 21 and the capability of the temperature conditioning apparatus 12.

To provide a night setback or change in the mode of operation of the thermostat to select a different temperature during a certain time period for both comfort and energy saving, a setback or deviation selector 22 is adjusted to select the amount of setback desired. When the thermostat moves into the setback condition, the temperature deviates by an amount selected by 22 from the control temperature selected by lever 13 in an upward or lower manner depending on whether the system switch is in cooling or heating.

To select the temperature setback time period or a second period of time of operation, switch 23 (S) is manually closed at the particular time when setback is to take place. For example, if the home owner wishes to set back the temperature during the heating season at 10:00 P.M. on a particular day, switch 23 is closed and counter chain 52 produces a series of pulses to the LED 30 as shown in FIG. 5. The first pulse is of a three second duration to indicate to the home owner that the energy saving time period will be programmed. The three second time period prevents momentary accidental closings from upsetting a previous programmed condition. Subsequently, the pulses are shorter and each pulse of the LED 30 is for each hour of the second or setback period of time desired. If the home owner wanted a setback temperature until 7:00 A.M., a nine hour setback period is selected. By holding button 23 downward until the LED flashed nine times, a nine hour delay is stored in the memory. Thereafter each 24 hour period or each day at 10:00 P.M. the temperature of the space is set back by the deviation amount selected by lever 22. For example, if the normal temperature was set by member 13 to control at 68°, and the setback deviation was selected for 15°, the setback temperature then drops to 53° for the nine hours until the control temperature was reestablished at 68° at 7:00 A.M. in the morning.

At any time, the home owner can review the time period which is stored in the memory by pushing review button (R) 25 which flashes LED 30 a number of pulses depending on how many hours are stored in memory 53. Such a review has no effect upon the stored memory time, but only gives the home owner an opportunity to know the length of time of the setback period.

The change button or switch (C) 24 provides for an overriding of the temperature control mode to move the control from the existing control mode to the other mode. If the thermostat is in the setback time period and the home owner wishes to have the normal 68° temperature, by operating the change switch 24, the temperature control is restored to the 68° control point until the next 24 hour time period expired, or 10:00 P.M. the next night, at which time the normal setback operation takes place.

As previously mentioned in connection with the circuit of FIG. 3, the invention is not limited to one particular program. A second set button, such as 23, would provide for a dual setback time period if such is desired, by a connection made at input 70 in FIG. 3A. Such would be particularly desirable for a family where the home is not occupied during the day so that a night setback can be accomplished from 10:00 P.M. to 7:00 A.M., and a daytime setback such as 9:00 A.M. to 5:00 P.M. can be obtained.

The embodiments of the invention in which an exclusive property or right is claimed are defined as follows:

1. A thermostat adapted to be connected to a remote temperature conditioning apparatus for controlling the temperature of air in a space to maintain a first temperature during a first period of time and a second temperature during a second period of time, comprising, temperature responsive means responsive to a space temperature, control circuit means adapted to be connected to the temperature conditioning apparatus, means connecting said temperature responsive means to said control circuit means for establishing a control temperature to maintain the first temperature in the space, single button manually settable electronic time interval means for providing a second period of time, and means connecting said time interval means to said control circuit means to change said control temperature to maintain a second temperature in the space for said second period of time each day.

2. The invention of claim 1 wherein said electronic time interval means comprises a counter chain circuit with a 24 hour timer for providing a series of electrical pulses, a memory circuit, a manually operated switch mounted on said thermostat and connected in said counter chain circuit, and a light emitting diode mounted on said thermostat and connected in said counter chain circuit to be energized by each of said pulses, whereby upon manually operating said switch said counter chain provides said series of electrical pulses energizing said light emitting diode, one for each time increment to be stored in said memory, to make up said second time period.

3. The invention of claim 2 wherein said series of electrical pulses comprises a first pulse of a first predetermined duration to indicate by observation of said diode that subsequent shorter pulses to follow to be one stored increment of time for each pulse to make said second time period.

4. The invention of claim 1 comprising visual indicating means mounted on the thermostat and electrically connected to said time interval means whereby upon manually setting said interval means for storing said second time period a visual indication of each time interval is provided.

5. The invention of claim 4 wherein said time interval means provides pulses of electrical voltage for storing a second time period and energizing said visual indicating means, said time interval means provides a first pulse of one duration and subsequent pulses for each time interval.

6. The invention of claim 5 comprising, review switch circuit means mounted in said thermostat for reviewing said second time period by providing a pulsing output to said visual indicating means equal to the number of said subsequent pulses of said time interval means.

7. An improvement in an energy saving thermostat, comprising, a temperature responsive means adapted to respond to space temperature, a control circuit connected to said responsive means and having an output adapted to be connected to a temperature conditioning apparatus for changing the temperature of the space, temperature control point setting means connected to said control circuit to select the temperature being controlled in the space, setback means connected to said control circuit to select a second temperature to be controlled in the space, and timer means connected to said setback means for selecting a time period during which the second temperature is to be maintained, the improvement comprising, manually operated time interval counter means providing an electric pulse for each increment of time for setting said timer and indication means providing an indication of each pulse for counting said increment of time.

8. The invention of claim 7 wherein said indication means is a visual indication means.

9. A method of setting an energy saving thermostat having a timer means for operating a thermostat temperature reset means wherein the time stored in memory by the timer means is indicated by signals of an indicating device for each increment of time when a setback switch is operated to store the time period in the memory, comprising the steps at the time an energy saving operation is to begin, the setback switch is operated to energize a timer means, the energy saving time period is determined and stored in the memory by counting the signals of the indicating device, and the set switch is released and an energy saving time period stored in the memory thereafter repeats each twenty-four hours at the time the energy saving operation is to begin.

10. The method of claim 9 wherein the steps comprise the counting of visual flashes of light from an illuminated indicating device.

11. The invention of claim 1 wherein said time interval means comprises means for indicating said second time period stored therein upon demand.

* * * * *